(12) United States Patent
Mitlmeier et al.

(10) Patent No.: US 8,492,930 B2
(45) Date of Patent: Jul. 23, 2013

(54) SWITCHING DEVICE AND METHOD FOR OPERATING SAME

(75) Inventors: Norbert Mitlmeier, Ursensollen (DE); Christian Oppermann, Amberg (DE); Bernhard Streich, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 382 days.

(21) Appl. No.: 12/920,393

(22) PCT Filed: Feb. 25, 2009

(86) PCT No.: PCT/EP2009/052192
§ 371 (c)(1),
(2), (4) Date: Aug. 31, 2010

(87) PCT Pub. No.: WO2009/121667
PCT Pub. Date: Oct. 8, 2009

(65) Prior Publication Data
US 2011/0001363 A1    Jan. 6, 2011

(30) Foreign Application Priority Data
Mar. 31, 2008 (DE) .......................... 10 2008 018 258

(51) Int. Cl.
*H02M 3/06* (2006.01)
(52) U.S. Cl.
USPC .......................................... 307/109; 307/326

(58) Field of Classification Search
USPC .......................................................... 307/109
See application file for complete search history.

(56) References Cited

U.S. PATENT DOCUMENTS

| 4,563,721 A | 1/1986 | Schroether |
| 6,384,558 B2 | 5/2002 | Yoshida et al. |
| 6,680,836 B1 | 1/2004 | Zizler |
| 2001/0013761 A1* | 8/2001 | Yoshida et al. ............... 318/254 |

FOREIGN PATENT DOCUMENTS

| CN | 1365503 | 8/2002 |
| DE | 3239840 A1 | 5/1984 |
| DE | 19825972 A1 | 12/1999 |
| EP | 1 110 773 | 6/2001 |
| EP | 1110773 A2 | 6/2001 |
| EP | 1 331 714 | 7/2003 |
| EP | 1331714 A2 | 7/2003 |

OTHER PUBLICATIONS

Office Action for corresponding Chinese patent application No. 200980105085.7 dated Aug. 28, 2012.

* cited by examiner

*Primary Examiner* — Robert L. Deberadinis
(74) *Attorney, Agent, or Firm* — Harness, Dickey & Pierce, P.L.C.

(57) ABSTRACT

A method for operating a switching device and a device for use with the method are provided. In at least one embodiment, an energy storage medium provided for EMC considerations, in particular a capacitor, is energized in a controlled fashion through short-term activation of a switching element even after the respective connected user is turned off, the energy storage medium being thereby discharged.

14 Claims, 2 Drawing Sheets

10 ms

≫ 10 ms

∼ 10...20 ms

SWITCHING DEVICE AND METHOD FOR OPERATING SAME

PRIORITY STATEMENT

This application is the national phase under 35 U.S.C. §371 of PCT International Application No. PCT/EP2009/052192 which has an International filing date of Feb. 25, 2009, which designates the United States of America, and which claims priority on German patent application number DE 10 2008 018 258.3 filed Mar. 31, 2008, the entire contents of each of which are hereby incorporated herein by reference.

FIELD

At least one embodiment of the invention generally relates to a switching device, especially an electromagnetic switching device with a power supply and a switching element, especially an electromagnetic switching element, e.g. a contactor or the like. The power supply is able to be supplied in a known manner with an external supply voltage and an external user, e.g. a motor, is likewise able to be connected to the switching element in a known manner. With the switching device, an operating voltage generated by its power supply is able to be supplied to the user over an outgoing line from the power supply via the switching element. The respective user is energized, i.e. activated, when the switching element will be or is activated.

BACKGROUND

It is known with these types of switching device that an electronic voltage analysis is carried out in the area of the power supply or by the power supply in order to activate the switching element as a function of the supply voltage applied and energize the respective user. It is known for such voltage analyses that these collect data for available DC or AC voltages over a defined period in respect of the external supply voltage, to enable an average value to be computed. It is known that DC or AC voltages can be distinguished in that peak values of an AC voltage are higher than the constant value of a comparable DC voltage.

With known devices there is likewise provision for a capacitor to be provided in an input circuit for improving electromagnetic compatibility (EMC). Such a capacitor or electrical energy storage medium is referred to below as the input capacitor. Even if such input capacitors are useful and sometimes necessary for improving EMC characteristics, using them produces the disadvantage of electrical power being stored when the external supply voltage is turned off and of the input capacitor only discharging slowly. The discharge behavior of the input capacitor in its turn influences the data obtained by the voltage analysis. This means that the voltage analysis can result in errors, because for example, as a result of missing zero crossings, a DC voltage is assumed and through the higher peak values too high a voltage is also assumed.

Known approaches attempt to solve this problem in that, for rapid discharging of the input capacitor or of each input capacitor, a resistor is connected in parallel to the input via which the external supply voltage is able to the supplied to the switching device. However this solution results in high power loss or long discharge time constants.

SUMMARY

At least one embodiment of the invention specifies an alternate form of embodiment of a switching device in which at least one of the above-mentioned disadvantages are avoided or their effects are at least reduced and with which a rapid discharging of the energy storage medium or of each energy storage medium arranged in the input circuit is possible.

In at least one embodiment, in a method for operating a switching device with a power supply and a switching element, with the power supply being supplied with an external supply voltage and an external user being connected to the switching element, with an operating voltage generated by the power supply able to be supplied with the switching element to the user via an outgoing operating voltage line from the power supply and with the power supply comprising at least one electrical energy store which is switched between the operating voltage line and a reference potential, there is provision, when the user is switched off, i.e. on withdrawal of the external supply voltage, for said user to be supplied with current from the energy stored in the electrical energy storage medium.

within at least one embodiment, a corresponding switching device is disclosed which is suitable for and is provided for carrying out the method outlined here and described in greater detail below. To this end there is provision with this type of switching device for the electrical energy storage medium to be a capacitor.

Advantageous embodiments of the invention are the subject matter of the subclaims. References back to other claims in such cases indicate the further embodiment of the subject matter of the main claim by the features of the respective subclaim; they are not to be understood as dispensing with the aim of a self-contained protection of the subject matter for the combinations of features of the referred-back subclaims. Furthermore, in respect of structuring the claims for a more detailed explanation of a feature in a subordinate claim, it is to be assumed that such a restriction is not present in the previous claims in each case.

In at least one embodiment, the short-term energization of the connected or connectable user is undertaken during a predetermined or predeterminable discharge time. The duration of the discharge time in this case is matched on the one hand to the memory capacity of the energy storage medium and on the other hand to an inertia of the user. The end result of this type of matching is that the energizing on the one hand means that the energy storage medium is fully or at least sufficiently discharged for unadulterated voltage analysis and on the other hand means that the user is not inadvertently put into operation. With a motor as an example of a user, a brief energization if the duration i.e. the discharge time is small enough, does not yet lead to a movement of the motor so that with the short-term energization, no danger arises for the units driven by the motor or for the operating personnel.

The short-term energization is also undertaken in accordance with a preferred form of embodiment once a predetermined or predeterminable wait time has elapsed after the user is switched off, since electromagnetic switching devices, because of their mass inertia, are not able to be switched off in "zero time". A wait time needs to be planned in accordingly. Not waiting for such a wait time can result in the switch-off time being lengthened and this resulting in a malfunction of the user.

The method outlined here and described in greater detail below is preferably implemented as a computer program or as program code for a microcontroller, with program code instructions able to be executed by a computer or by microcontroller. To this extent, at least one embodiment of the invention also relates to such program code executing the method described here and further explained below. In the same way, at least one embodiment of the invention also relates to a computer program product, especially a storage medium and the like, or to a microcontroller with such program code. All options for implementing the method in software, hardware and/or firmware are grouped together here under the title of "Means for implementation of the method". This means that at least one embodiment of the invention finally also relates to a switching device of the type specified at the outset with a control circuit comprising such means for implementing the method or having access to such means, i.e. a control circuit for example with such a computer program or a microcontroller functioning as a control circuit with such program code.

A preferred form of embodiment of the switching device is characterized by the fact that the wait time and the discharge time are coded into the control circuit and the elapsing of the wait time after the user is switched off is able to be established and after the wait time has elapsed the user is able to be energized for the duration of the discharge time.

BRIEF DESCRIPTION OF THE DRAWINGS

An example embodiment of the invention is explained in greater detail below with reference to the drawings. Corresponding objects or elements are provided with the same reference symbols in all figures.

The example embodiment or each example embodiment is not to be seen as restricting the invention. Instead numerous variations and modifications are possible within the framework of the current disclosure, especially such variants, elements and combinations and/or materials which for example by combination or variation of individual features or elements or method steps described in conjunction with the general description and forms of embodiment as well as described in the claims and contained in the drawings are able to be derived by the person skilled in the art in respect of achieving the object and which lead by combinable features to a new object or to new method steps or sequences of method steps.

The figures show:

Figure 1:
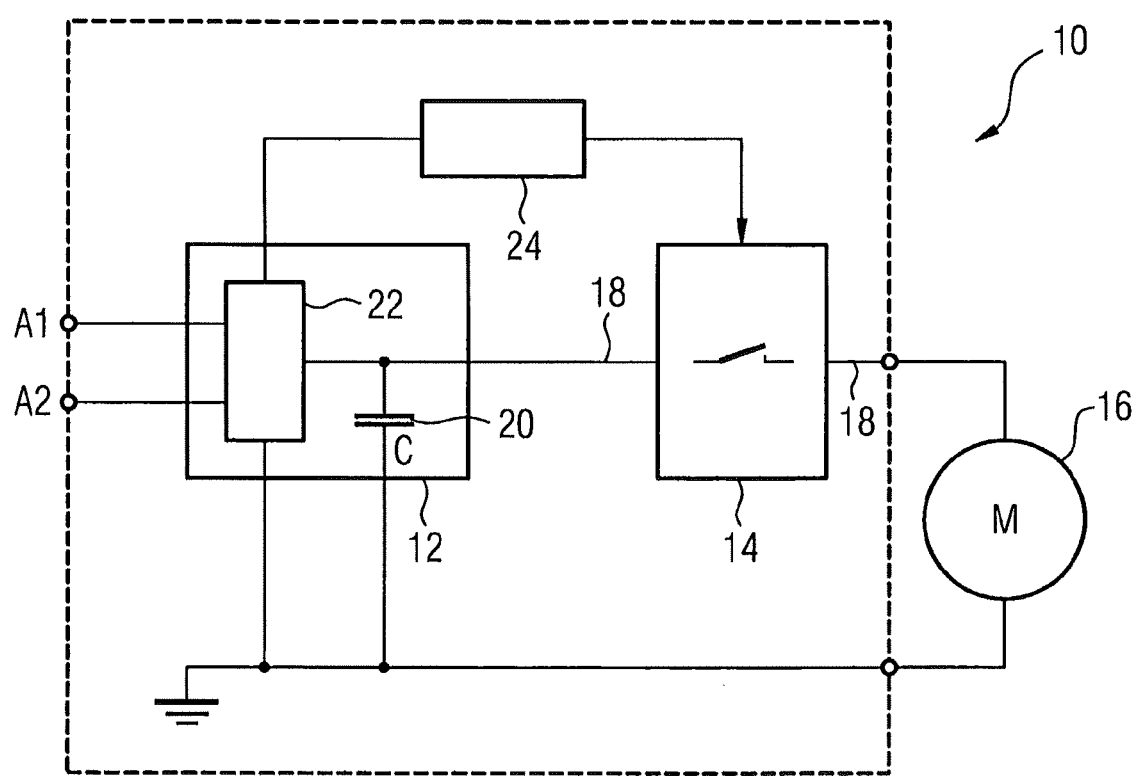
Figure 2:
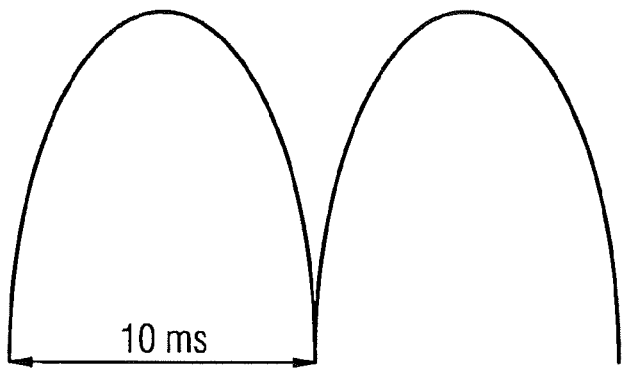
Figure 3:
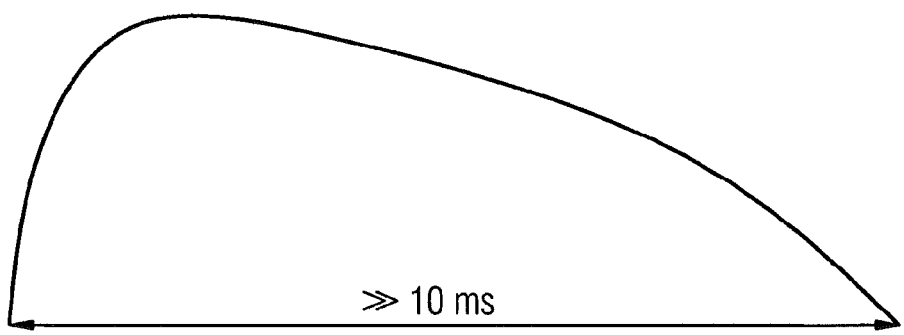
Figure 4:
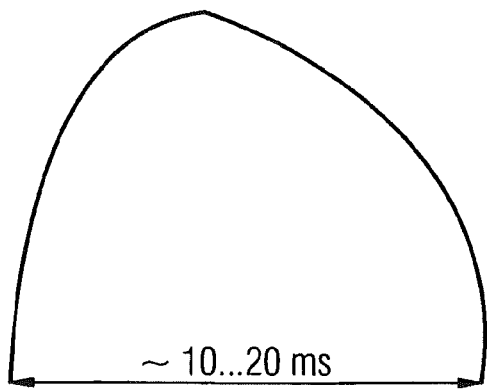

FIG. 1: a simplified schematic basic diagram of an inventive switching device and FIG. 2 to FIG. 4: Signal curves for voltages able to be measured in an input branch of the switching device.

DESCRIPTION OF THE EXAMPLE EMBODIMENTS

FIG. 1 shows a switching device indicated in its entirety by the number 10 with a power supply 12 and a switching element 14, e.g. a contactor or the like. The power supply 12 is able to be fed an external supply voltage able to be applied to terminals A1, A2. An external user 16 is able to be connected to the switching element 14, with a motor M being shown as an example thereof in the diagram.

An operating voltage generated by the power supply 12 is able to be supplied with the switching element 14 to the user 16 via an outgoing operating voltage line 18 from the power supply 12. The power supply 12 features at least one electrical energy storage medium 20, shown by way of example in FIG. 1 as capacitor C, which is connected between the operating voltage line 18 and a reference potential, here ground potential. The power supply 12 features a converter 22 which generates the operating voltage from the external supply voltage present at A1, A2.

Furthermore the switching device 10 has a control circuit which is provided for activating the switching element 14 and for the through switching of the operating voltage to the user 16 brought about by this action. When the switching element 14 is activated, the user 16 is thus "energized".

Either the converter 22 and/or the control circuit 24 carry out an analysis of the external supply voltage. To this end, as a voltage analysis, data relating to the external supply voltage is collected over a defined period and an average value is computed. In addition a decision is made as to whether an AC voltage or a DC voltage is present as the external supply voltage. Peak values are known to be higher for AC voltage than for DC voltage. If for example an AC voltage is present as an external supply voltage, this is rectified by the converter 22, as shown in FIG. 2.

When the external supply voltage is switched off, the energy storage medium 20 discharges, i.e. the capacitor C in the case shown, and a signal form can be produced for the voltage analysis, as is shown in FIG. 3. With such a signal form the average value is falsified such that too high a voltage is recognized by the voltage analysis. Because of missing zero crossings this can result in an incorrect type of voltage being assumed, here DC voltage for example. Such false analyses can result in the user 16 being inadvertently switched on again.

To avoid this, there is provision in accordance with an embodiment of the invention that when the user 16 is switched off, i.e. when the external supply voltage is withdrawn, the user is energized in a controlled manner by activation of the switching element 14 for a short period from the energy storage medium in the electrical energy storage medium 20. This discharges the energy storage medium 20 in a defined and controlled manner, so that a signal is produced for voltage analysis, as is depicted in the example shown in FIG. 4. The energy storage medium 20 will thus be discharged very much more quickly than is the case in the situation shown in FIG. 3. Incorrect voltage evaluations are thus effectively prevented or at least reduced.

For a controlled and defined discharging of the energy storage medium 20, there is provision for the short-term energizing of the respective user 16 to be undertaken from the remaining electrical residual energy in the energy storage medium 20 during a predetermined or predeterminable discharge time. This is especially matched to a storage capacity of the energy storage medium 20 and an inertia of the user 16 such that the energy storage medium 20 is sufficiently discharged and the user 16 is only put unto operation imperceptibly, if at all.

With a motor M as an example of a user 16, for a sufficiently short energizing—i.e. a sufficiently short discharge time, during which such an energizing takes place—because of the mass inertia of the movable components involved, no undesired movement is to be obtained. The short-term energizing of the respective user 16 is undertaken after a predetermined or predeterminable wait time subsequent to withdrawal of the external supply voltage.

For this purpose, the control circuit comprises hardware and/or software devices/modules/segments for implementation of the method described. In particular the wait time and the discharge time are coded into the control circuit 24 for this purpose. By way of the control circuit 24, after the user 16 has been switched off by withdrawal of the external supply voltage, there is a time during which the circuit waits for the wait time to elapse and after the wait time has elapsed, energizes the user 16 for the duration of the discharge time so that the energy storage medium 20 is discharged or at least sufficiently discharged.

An embodiment of the invention can thus be summarized as follows:

With switching devices 10 of the type described here, especially low-voltage switching devices, current paths, i.e. the operating voltage line or each operating voltage line 18 described here, can be switched between an electrical supply device and users 16, and can thereby switch their operating currents. I.e. by current paths being opened by the switching device 10, especially by way of a switching element 14 included therein, the connected users 16 can be safely switched on and off. An electrical low-voltage switching element 14, such as a contactor, a power switch, a compact starter etc. for example, has one a more main contacts for switching the current paths, which can be controlled by one or more control magnets by way of a control circuit 24 designed for this purpose. To avoid incorrect voltage evaluations in the area of a power supply 12 while simultaneously retaining a sufficient electromagnetic compatibility, an electrical energy storage medium 20 provided for EMC considerations, especially a capacitor, is discharged in a controlled fashion such that, when the respective user is turned off, controlled activation of the switching element 14 causes the user to be energized for a short period from the energy still stored in the energy storage medium 20.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for operating a switching device with a power supply and a switching element, the method comprising:
   supplying the power supply with an external supply voltage, an external user being connected to the switching element, an operating voltage generated by the power supply being supplyable to the user with the switching element via an outgoing operating voltage line from the power supply, and the power supply including at least one electrical energy storage medium connected between an operating voltage line and a reference potential; and
   energizing the user for a short term by activation of the switching element, when the user is switched off, from the energy stored in the at least one electrical energy storage medium, wherein
   the short-term energization occurs during a discharge time, and
   a duration of the discharge time is matched to a storage capacity of the energy storage medium on the one hand and to an inertia of the user on another hand.

2. The method as claimed in claim 1, wherein the short-term energization occurs after a wait time, once the user is switched off.

3. A switching device, comprising:
   a control circuit for executing the method as claimed in claim 2, wherein the wait time and the discharge time are coded in the control circuit and, after the user is switched off, the elapsing of the wait time able to the established by way of the control circuit and after the wait time has elapsed, the user being able to be energized for the duration of the discharge time.

4. A computer program stored on a computer readable medium including program code instructions, able to be executed by a computer or microcontroller, for implementing the method as claimed in claim 1 when the computer program is executed on a computer or microcontroller.

5. A computer program storage medium, comprising the computer program as claimed in claim 4.

6. A switching device, comprising:
   a control circuit including the computer program as claimed in claim 4.

7. The switching device as claimed in claim 6, wherein the control circuit detects a state of the switching element and the power supply.

8. A switching device for carrying out the method as claimed in claim 1, wherein the at least one electrical energy storage medium is a capacitor.

9. The method as claimed in claim 1, wherein the short-term energization occurs after a wait time, once the user is switched off.

10. A computer readable medium including program segments for, when executed on a computer device, causing the computer device to implement the method of claim 1.

11. The method as claimed in claim 1, wherein the energy storage medium is connected in series with the power supply and the switching element.

12. The method as claimed in claim 1, wherein discharging the energy storage medium does not result in movement of the user.

13. The method as claimed in claim 1, wherein supplying power to the user includes determining a detected state of the power supply.

14. The method as claimed in claim 1, further comprising discharging the energy storage medium based on a detected state of the power supply.

* * * * *